United States Patent
Otani et al.

(10) Patent No.: US 10,764,479 B2
(45) Date of Patent: Sep. 1, 2020

(54) IMAGING APPARATUS, MANUFACTURING APPARATUS, MANUFACTURING METHOD AND ELECTRONIC APPLIANCE

(71) Applicant: SONY CORPORATION, Tokyo (JP)

(72) Inventors: Hidetsugu Otani, Kumamoto (JP); Yuuji Kishigami, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/054,441

(22) Filed: Aug. 3, 2018

(65) Prior Publication Data

US 2018/0343371 A1  Nov. 29, 2018

Related U.S. Application Data

(63) Continuation of application No. 14/903,110, filed as application No. PCT/JP2014/071035 on Aug. 8, 2014, now Pat. No. 10,044,917.

(30) Foreign Application Priority Data

Aug. 8, 2013 (JP) .................................. 2013-172536

(51) Int. Cl.
  *H04N 5/225*  (2006.01)
  *G03B 17/02*  (2006.01)
  (Continued)

(52) U.S. Cl.
  CPC ............. *H04N 5/2254* (2013.01); *G02B 7/08* (2013.01); *G03B 17/02* (2013.01); *H04N 5/2252* (2013.01);
  (Continued)

(58) Field of Classification Search
  CPC ...... H04N 5/335; H04N 5/369; H04N 5/2251; H04N 5/2252; H04N 5/2253;
  (Continued)

(56) References Cited

U.S. PATENT DOCUMENTS

2004/0251509 A1  12/2004  Choi
2005/0012032 A1*  1/2005  Onodera ............. H01L 21/4832
                                                     250/214.1
(Continued)

FOREIGN PATENT DOCUMENTS

CN  1494139 A  5/2004
CN  1842137 A  10/2006
(Continued)

OTHER PUBLICATIONS

Office Action for CN Patent Application No. 201480045323.0, dated Jul. 3, 2018, 08 pages of Office Action and 12 pages of English Translation.

(Continued)

*Primary Examiner* — Nelson D. Hernández Hernández
(74) *Attorney, Agent, or Firm* — Chip Law Group (57) ABSTRACT

A manufacturing apparatus, a manufacturing method, and an electronic appliance that contribute to miniaturization and thinning of an imaging apparatus. The imaging apparatus includes a first circuit board in which an imaging element is mounted on a center portion, a component that is mounted on an outer circumference portion of the center portion of the first circuit board, and a member that incorporates the component and is provided in the outer circumference portion and is formed by a mold method. The imaging apparatus further includes a lens barrel that holds a lens, in which a frame that supports a portion including the lens barrel is located on the member. Further, the frame includes an infra red cut filter (IRCF).

21 Claims, 6 Drawing Sheets (51) Int. Cl.
  *G02B 5/20* (2006.01)
  *G02B 7/08* (2006.01)
  *G03B 11/00* (2006.01)
  *G02B 13/00* (2006.01)

(52) U.S. Cl.
  CPC ......... *H04N 5/2253* (2013.01); *H04N 5/2257* (2013.01); *G02B 5/208* (2013.01); *G02B 13/001* (2013.01); *G03B 11/00* (2013.01)

(58) Field of Classification Search
  CPC .... H04N 5/2254; G03B 17/02; G02B 13/001; G06K 9/209; H01L 27/14634; H01L 27/14618
  See application file for complete search history.

(56) References Cited

U.S. PATENT DOCUMENTS

| | | | |
|---|---|---|---|
| 2006/0103953 | A1 | 5/2006 | Lee et al. |
| 2006/0219884 | A1 | 10/2006 | Tsukamoto et al. |
| 2006/0219885 | A1 | 10/2006 | Kinoshita et al. |
| 2010/0103296 | A1* | 4/2010 | Nakagiri ........... H01L 27/14618 348/294 |
| 2011/0084118 | A1 | 4/2011 | Wada et al. |
| 2011/0194023 | A1 | 8/2011 | Tam et al. |
| 2012/0105713 | A1 | 5/2012 | Luan |

FOREIGN PATENT DOCUMENTS

| | | |
|---|---|---|
| CN | 1842139 A | 10/2006 |
| CN | 101569178 A | 10/2009 |
| CN | 102782574 A | 11/2012 |
| DE | 102005021176 A1 | 5/2006 |
| EP | 1708279 A2 | 10/2006 |
| EP | 1708476 A2 | 10/2006 |
| EP | 2136552 A1 | 12/2009 |
| JP | 09-130683 A | 5/1997 |
| JP | 2006-166398 A | 6/2006 |
| JP | 2006-276463 A | 10/2006 |
| JP | 2006-287533 A | 10/2006 |
| JP | 2008-312104 A | 12/2008 |
| JP | 2010-041213 A | 2/2010 |
| JP | 2011-086670 A | 4/2011 |
| JP | 2013-070270 A | 4/2013 |
| KR | 10-2006-0104949 A | 10/2006 |
| KR | 10-2006-0105677 A | 10/2006 |
| KR | 10-2009-0128374 A | 12/2009 |
| TW | 00I302209 B | 10/2008 |
| TW | 00I305959 B | 2/2009 |
| WO | 2008/132802 A1 | 11/2008 |

OTHER PUBLICATIONS

Notice of Allowance and Fees Due for U.S. Appl. No. 14/903,110, dated May 17, 2018, 02 pages.

Notice of Allowance and Fees Due for U.S. Appl. No. 14/903,110, dated Apr. 10, 2018, 11 pages.

Non-Final Rejection for U.S. Appl. No. 14/903,110, dated Nov. 24, 2017, 24 pages.

Advisory Action for U.S. Appl. No. 14/903,110, dated Aug. 25, 2017, 03 pages.

Final Rejection for U.S. Appl. No. 14/903,110, dated Jun. 9, 2017, 24 pages.

Non-Final Rejection for U.S. Appl. No. 14/903,110, dated Dec. 2, 2016, 13 pages.

International Search Report and Written Opinion of PCT Application No. PCT/JP2014/071035, dated Nov. 4, 2014, 09 pages of English Translation and 08 pages of ISRWO.

International Preliminary Report on Patentability of PCT Application No. PCT/JP2014/071035, dated Mar. 3, 2016, 10 pages of English Translation and 05 pages of IPRP.

Office Action for JP Patent Application No. 2015-532812, dated Apr. 24, 2018, 07 pages of Office Action and 04 pages of English Translation.

* cited by examiner

IMAGING APPARATUS, MANUFACTURING APPARATUS, MANUFACTURING METHOD AND ELECTRONIC APPLIANCE

CROSS REFERENCES TO RELATED APPLICATIONS

The present application is a continuation application of U.S. patent application Ser. No. 14/903,110 filed Jan. 6, 2016, which is a national stage entry of PCT/JP2014/071035, filed Aug. 8, 2014, and claims the benefit of priority from prior Japanese Patent Application 2013-172536, filed Aug. 22, 2013, the entire contents of which are hereby incorporated by reference. Each of the above-referenced applications is hereby incorporated herein by reference in its entirety.

TECHNICAL FIELD

The present technology relates to an imaging apparatus, a manufacturing apparatus, a manufacturing method, and an electronic appliance. Particularly, it relates to an imaging apparatus, a manufacturing apparatus, a manufacturing method, and an electronic appliance that contribute to miniaturization of a module.

BACKGROUND ART

In recent years, it has been desirable to miniaturize a digital camera, and with the spread of a cellular phone having a function of a digital camera, to miniaturize an autofocus driving apparatus and the like. It has been proposed to realize miniaturization by sealing a lens holder, a chip and a circuit board (see Patent Literature 1).

CITATION LIST

Patent Literature

Patent Literature 1: JP 2007-523568T

SUMMARY OF INVENTION

Technical Problem

Although miniaturization of an optical system such as a lens makes it possible to realize miniaturization of an imaging apparatus, undesirable states such as a reduction in optical amount and deterioration in image quality are highly likely to be generated. Therefore, it is not preferable to miniaturize the imaging apparatus by miniaturizing a lens and the like. However, as described above, it has been desirable to further miniaturize the imaging apparatus.

The present technology has been developed in light of such a situation, and it is capable of realizing further miniaturization of the imaging apparatus.

Solution to Problem

An imaging apparatus according to an embodiment of the present technology includes: a first circuit board in which an imaging element is mounted on a center portion; a component that is mounted on an outer circumference portion of the center portion of the first circuit board; and a member that incorporates the component and is provided in the outer circumference portion.

The member can be formed by a mold method.

The imaging apparatus can further include: a lens barrel that holds a lens. A frame that supports a portion including the lens barrel can be located on the member.

The frame can include an infra red cut filter (IRCF).

One side of the first circuit board can connected to a second circuit board. A reinforcement member for reinforcing connection between the first circuit board and the second circuit board can provided in a predetermined portion of the second circuit board and the member. The imaging apparatus can further include: a lens barrel that holds a lens. A portion including the lens barrel can be located on the member.

The member can be formed in a shape having a step. An infra red cut filter (IRCF) can be mounted on a portion of the step.

A portion of the first circuit board on which the imaging element is to be mounted can be formed into a cavity. A second circuit board can be attached to a lower portion of the first circuit board, and the imaging element can be mounted on the second circuit board.

The member can be formed by covering, with a predetermined mold, the first circuit board to which the component is attached, and injecting a resin to the mold.

A manufacturing apparatus according to an embodiment of the present technology manufactures an imaging apparatus including a first circuit board in which an imaging element is mounted on a center portion, a component that is mounted on an outer circumference portion of the center portion of the first circuit board, and a member that incorporates the component and is provided in the outer circumference portion.

The member can be formed by covering, with a predetermined mold, the first circuit board to which the component is attached, and injecting a resin to the mold.

A manufacturing method according to an embodiment of the present technology for a manufacturing apparatus that manufactures an imaging apparatus, the imaging apparatus including a first circuit board in which an imaging element is mounted on a center portion, a component that is mounted on an outer circumference portion of the center portion of the first circuit board, and a member that incorporates the component and is provided in the outer circumference portion, includes: a step of forming the member by covering, with a predetermined mold, the first circuit board on which the component is mounted, and injecting a resin to the mold.

An electronic appliance according to an embodiment of the present technology includes: an imaging apparatus including a first circuit board in which an imaging element is mounted on a center portion, a component that is mounted on an outer circumference portion of the center portion of the first circuit board, and a member that incorporates the component and is provided in the outer circumference portion; and a signal processing unit that performs signal processing for a pixel signal outputted from the imaging element.

An imaging apparatus according to an embodiment of the present technology at least includes a first circuit board on which an imaging element is mounted in a center portion, a component mounted in an outer circumference portion of the center portion of the first circuit board, and a member incorporating the component and provided in the outer circumference portion.

In a manufacturing apparatus and a manufacturing method according to an embodiment of the present technology, the imaging apparatus is manufactured.

In an electronic compliance according to an embodiment of the present technology, the imaging apparatus is included.

Advantageous Effects of Invention

According to an embodiment of the present technology, it is possible to miniaturize the imaging apparatus.

Note that the effect described here is not limited, and may be any effect described in the present disclosure.

DESCRIPTION OF EMBODIMENTS

An aspect for implementing the present technology (hereinafter referred to as an embodiment) will be described below. Note that the description will be provided in the following order.
1. Configuration of Imaging Apparatus
2. Configuration of Lower Part of Imaging Apparatus
3. Manufacturing of Imaging Apparatus
4. Another Configuration of Lower Part of Imaging Apparatus
5. Electronic Appliance
<Configuration of Imaging Apparatus>

Figure 1:
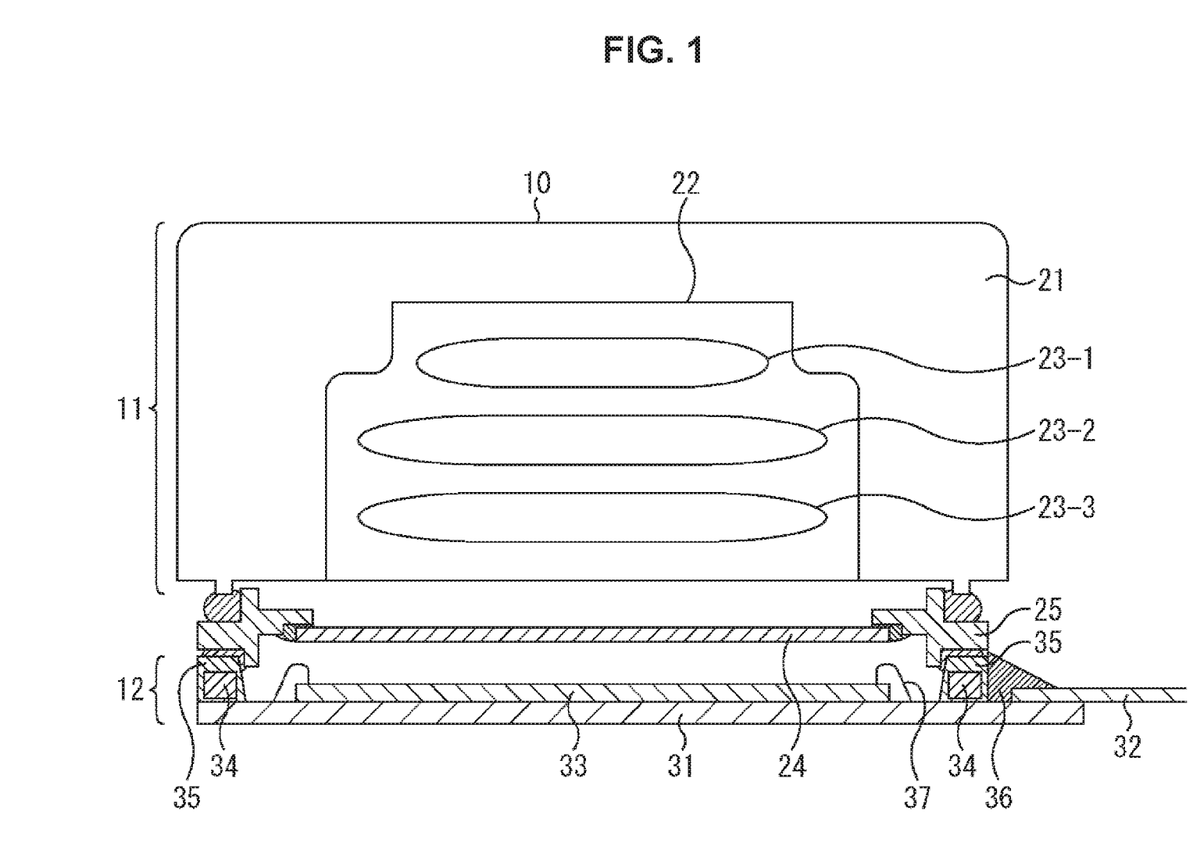
FIG. 1 is a cross-sectional diagram illustrating a configuration of an imaging apparatus.
Figure 2:
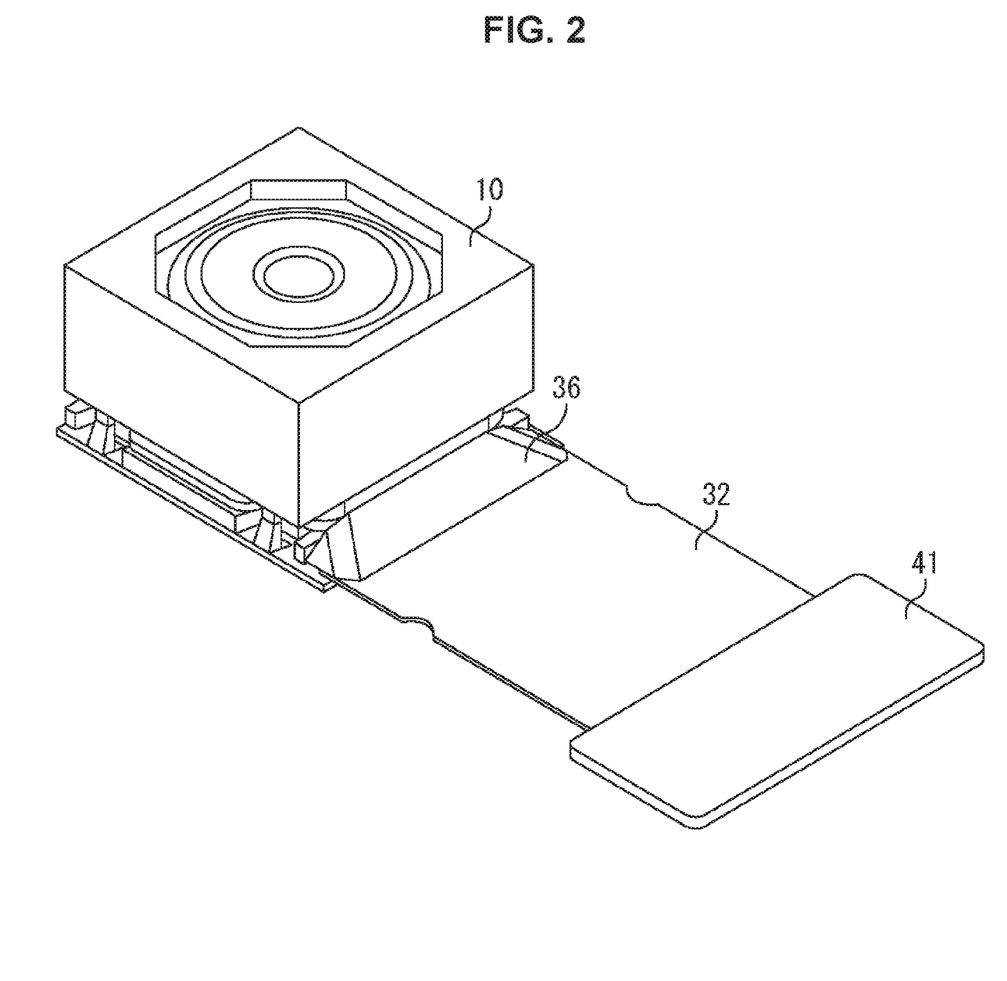
FIG. 2 is a diagram illustrating the imaging apparatus.

FIG. 1 is a cross-sectional diagram illustrating a configuration of an imaging apparatus. Further, FIG. 2 is a diagram illustrating an exterior configuration of the imaging apparatus. An imaging apparatus 10 of FIG. 1 includes an upper part 11 and a lower part 12. Here, for convenience of explanation, description is provided assuming that the imaging apparatus 10 includes the upper part 11 and the lower part 12.

The upper part 11 includes an actuator 21, a lens barrel 22, a lens 23, an infra red cut filter (IRCF) 24, and a frame 25. The lower part 12 includes a first circuit board 31, a second circuit board 32, an imaging element 33, a component 34 and a mold part 35.

A lens 23-1, a lens 23-2 and a lens 23-3 are incorporated in the inside of the lens barrel 22, and the lens barrel 22 holds those lenses 23-1 to 23-3. The lens barrel 22 is contained in the actuator 21, and the lower part 12 is attached to the lower part of the actuator 21.

For example, a screw (not shown) is included on a side face in the outside of the lens barrel 22, and a screw (not shown) is included at such a position as to be screwed to this screw in one part in the inside of the actuator 21, and the screw of the lens barrel 22 and the screw in the inside of the actuator 21 are screwed to each other. The lens barrel 22 is screwed to the actuator 21 in order to adjust a distance from the imaging element 33 (for focusing) during manufacturing. Note that such a method for attaching the lens barrel 22 to the actuator 21 is an example, and the lens barrel 22 may be attached to the actuator 21 by another mechanism.

When the lens barrel 22 is configured to be movable in the vertical direction in the drawing so that an auto-focus (AF) can be performed, for example, a coil is provided on a side face of the lens barrel 22 (a lens carry having the lens barrel 22 attached thereto). Further, a magnet is provided at such a position as to face the coil in the inside of the actuator 21. A yoke is included in the magnet, and a voice coil motor includes the coil, the magnet and the yoke.

When a current flows in the coil, force is generated in the vertical direction in the drawing. This generated force moves the lens barrel 22 in the upper direction or the lower direction. When the lens barrel 22 is moved, a distance between the imaging element 33 and the lenses 23-1 to 23-3 held by the lens barrel 22 is changed. Such a mechanism can realize the auto-focus.

Note that another mechanism may realize the auto-focus, and a configuration is applied according to a method for realizing that.

The imaging element 33 is provided in the center portion of the lower part 12. The imaging element 33 is attached onto the first circuit board 31 and connected to the first circuit board 31 by wiring 37. The plurality of components 34 for processing a signal from the imaging element 33 are arranged in a portion around the imaging element 33 in the outer circumference part of the first circuit board 31 on the top of the first circuit board 31, and are attached onto the first circuit board 31. This component 34 is arranged in such a manner that one side is in contact with the first circuit board 31 and the other three sides are surrounded by the mold part 35.

As described later, the mold part 35 is manufactured by, for example, a mold method. Note that, although it is described as the mold part here, it is not limited to the mold, and as described later it may be a member incorporating the components 34, functioning as a protection part for protecting the components 34, and having a function as a holding part supporting the upper part 11.

The frame 25 is attached to a face on a side opposite to the first circuit board 31 in the upper part of the mold part 35. This frame 25 has a function holding the IRCF 24. Further, the lens barrel 22 and others are provided on a side opposite to a side in contact with the mold part 35, of the frame 25.

In one side of the first circuit board 31, a portion to which the second circuit board 32 is connected is provided. The second circuit board 32 is, for example, a flexible print board (FPC), and is used as a circuit board for supplying a signal from the first circuit board 31 to a connector 41 as shown in FIG. 2.

The second circuit board 32 is attached so as to be put on the one side of the first circuit board 31, but as shown in FIG. 1 and FIG. 2, a reinforcement member 36 is provided in a part on the second circuit board 32 in order to reinforce the attached portion.

<Configuration of Lower Part of Imaging Apparatus>

The imaging apparatus 10 to which the present technology is applied is configured to allow the thickness of the first circuit board 31 to be reduced and allow the components 34 to be protected from a shock or the like, by causing the mold part 35 to support the frame 25. This will be described with reference to FIG. 3.

Figure 3:
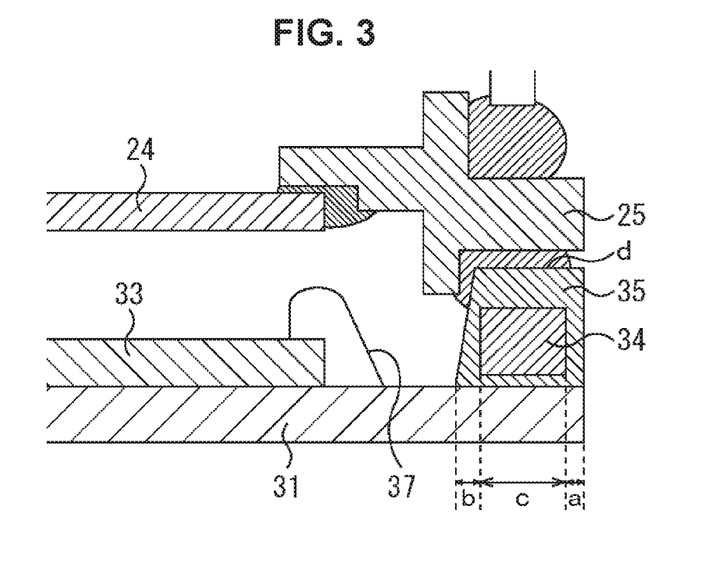
FIG. 3 is a cross-sectional diagram illustrating a configuration of a lower part of the imaging apparatus.

FIG. 3 is an enlarged diagram illustrating a right side part of the lower part 12 of the imaging apparatus 10. As shown in FIG. 3, let a length from the right end of the component 34 to the right end of the mold part 35 be a width a, and let a length from the left end of the component 34 to the left end of the mold part 35 be a width b. Further, let a width of the component 34 be a width c.

As described later, the mold part 35 can be formed by injecting a resin. Injecting a resin to form the mold part 35 makes it possible to form the mold part 35 while the components 34 are contained in the mold part 35 and the mold part 35 is in contact with the components 34. Therefore, it can be thought that the components 34 are incorporated in the mold part 35 in a pseudo manner, and constitute a part of the mold part 35. Constituting a part of the mold part 35 means a state in which a load of the upper part 11 is applied to the mold part 35, but the load is applied not only to the mold part 35 but to the components 34.

The load is dispersed when supporting the upper part 11 by the components 34 and the mold part 35 more than when supporting the upper part 11 only by the mold part 35, making it possible to prevent warpage and the like from being generated in the first circuit board 31. This will be described in comparison with when the frame 25 is assumed to be in contact with the first circuit board 31 to support the upper part 11 without providing the mold part 35.

Figure 4:
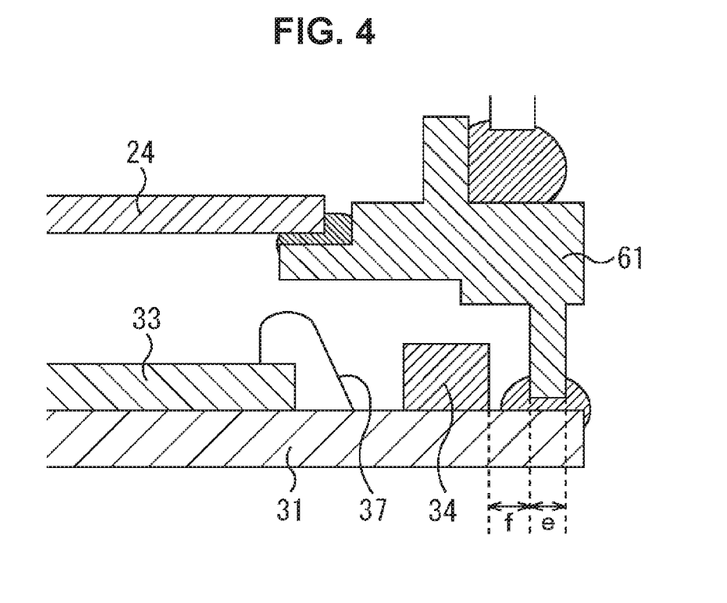
FIG. 4 is a cross-sectional diagram illustrating another configuration of the lower part of the imaging apparatus.

FIG. 4 is a diagram illustrating a structure when the frame 25 is in contact with the first circuit board 31 to support the upper part 11 without providing the mold part 35. Further, similarly to FIG. 3, FIG. 4 is an enlarged diagram illustrating a right side part of the lower part 12. Since the lower part 12 shown in FIG. 4 has a frame 61 having a shape different from that of the frame 25 of FIG. 3, and the other structural elements are similar to those of the lower part 12 of FIG. 4, they are denoted with the same signs and description will be continued.

In the lower part 12 shown in FIG. 4, the frame 61 is in direct contact with the first circuit board 31. A portion of the frame 61 in contact with the first circuit board 31 is optionally described as a leg. As shown in FIG. 4, a length of the portion of the frame 61 in contact with the first circuit board 31 is a width e, and a width of a space between the left side of the leg portion of the frame 61 and the right side of the component 24 is a width f.

When the upper part 11 and the lower part 12 are integrated in such a manner that the components 34 are attached to the first circuit board 31 and then the frame 61 is put on the first circuit board 31, it is necessary to provide a gap between the component 34 and the leg of the frame 61 so as to prevent the leg of the frame 61 from coming into contact with the component 34 when the frame 61 is put on the first circuit board 31. This gap is to be the width f.

When the frame 61 is directly put on the first circuit board 31, and the upper part 11 is put on the first circuit board 31, the leg portion of the frame 61 having the width e will support the upper part 11. When the leg portion (width e) is thinned, the load is concentrated on the thinned led portion. The leg portions of the frame 61 are provided at such positions as to surround the imaging element 33 in the outer circumference portion of the first circuit board 31.

That is, in this case, the load will be locally applied to the outer circumference portion of the first circuit board 31. When such a local load is applied, warpage may be generated in the first circuit board 31. In order to prevent the generation of such warpage, it is necessary to increase the thickness of the first circuit board 31, or increase the width e of the leg portion of the frame 61.

Accordingly, when the frame 61 is provided so as to be in direct contact with the first circuit board 31, it becomes necessary to provide a certain level of the width e and the gap width f.

In contrast, when the mold part 35 is provided, referring to FIG. 3 again, the first circuit board 31 is in contact with the mold part 35 at the width of the width a+the width b. Further, in consideration of the components 34 incorporated in the mold part 35 in a pseudo manner, the mold part 35 is in contact with the first circuit board 31 at the width a+the width b+the width c. Therefore, the mold part 35 having the width of the width a+the width b+the width c will support the upper part 11.

It is evident that the width a+the width b+the width c can be greater than the width e shown in FIG. 4. Further, when the width e is assumed to be set to the same width as the width a+the width b+the width c, the width of the leg portion of the frame 61 is increased, and thus it is necessary to increase a size of the first circuit board 31 on which the frame 61 is put, thereby preventing the miniaturization of the imaging apparatus 10.

On the other hand, when the width a+the width b+the width c is assumed to be set to be the same width as the width e, the thickness of the width a or the width b may be reduced. Therefore, as shown in FIG. 3, when the mold part 35 is provided, it is possible to obtain a configuration contributing to the miniaturization of the imaging apparatus 10.

Furthermore, it is easy to set the width a+the width b+the width c to be greater than the width e. For example, when the width e is assumed to be the same as the width c, the width a+the width b+the width c is greater than the width e by the width a+the width b. In this manner, when the width a+the width b+the width c can be increased, the load applied to the first circuit board 31 by the upper part 11 can be dispersed.

The dispersion of the load allows the reason for the warpage of the first circuit board 31 to be eliminated. Therefore, when the mold part 35 is provided, it is possible to reduce the thickness of the first circuit board 31. Also from this point of view, it is possible to miniaturize (thin) the imaging apparatus 10.

Furthermore, as described with reference to FIG. 4, when the frame 61 is in direct contact with the first circuit board 31, it is necessary to provide the gap having the width f in consideration of the assembly of the imaging apparatus 10. In the mold part 35 shown in FIG. 3, however, it is not necessary to provide such a gap. Therefore, it is evident to miniaturize the first circuit board 31 by the width f.

When the mold part 35 is provided in this manner, it is possible to support the upper part 11 by the width a+the width b+the width c, making it possible to miniaturize or thin the imaging apparatus 10. Further, when the upper part 11 can be supported by the width a+the width b+the width c, it becomes possible to improve the rigidity.

For example, even when force is applied to the imaging apparatus 10 from above, since the upper part 11 is supported by the width a+the width b+the width c, the applied force can be dispersed to prevent damage to the first circuit board 31 and others. Further, the components 34 are incorporated in the mold part 35 to allow the components 34 to be protected by the mold part 35, making it possible to prevent the components 34 from being damaged by the applied force.

<Manufacturing of Imaging Apparatus>

Next, manufacturing of the imaging apparatus 10 having the mold part 35 described with reference to FIG. 1 to FIG. 3 will be descried in addition.

Figure 5:
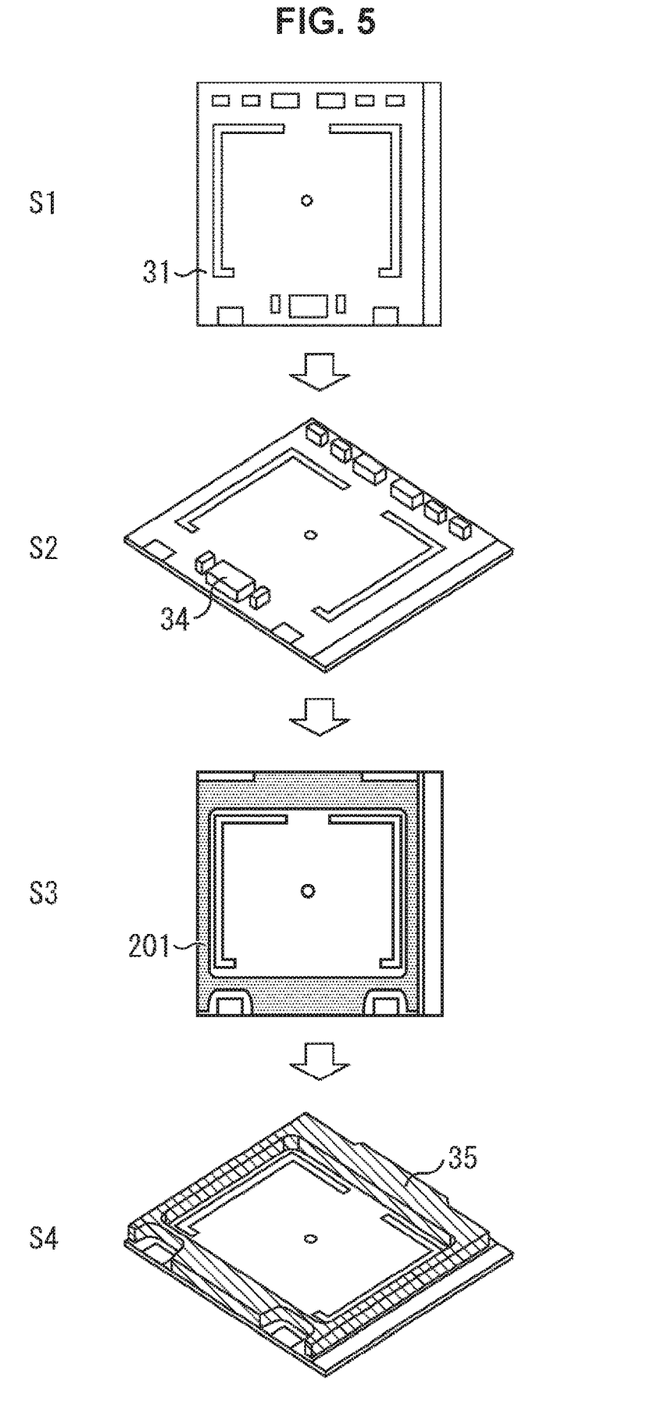
FIG. 5 is a diagram for explaining manufacturing of the imaging apparatus.

At Step S1, the first circuit board 31 is set. As shown at Step S1, in the first circuit board 31, a region on which the imaging element 33 is to be mounted is provided in the center portion, and a region on which the components are to be mounted is provided in the outer circumference portion of the center portion. Further, a region to be connected to the second circuit board 32 is provided on the right side in the drawing.

At Step S2, the components 34 are mounted on the first circuit board 31. As shown in FIG. 5, the plurality of components 34 are mounted on a predetermined portion of the first circuit board 31. Note that, in the drawing at Step S2 shown in FIG. 5, there has been shown the example where the components 34 are mounted on the upper portion and the lower portion of the first circuit board 31, respectively, but the components 34 may be also mounted on another portion, for example, the right portion or the left portion.

At Step S3, mold-sealing is performed. A mold 201 having a predetermined shape is put on the first circuit board 31 on which the components 34 are mounted, and a resin is injected to the mold 201 to perform the mold-sealing. The mold 201, as shown in Step S3 of FIG. 5, is shaped so as to cover the components 34, and is shaped so as to surround the outer circumference portion of the first circuit board 31 at a predetermined width.

Further, in the mold 201, a width on a side in contact with the first circuit board 31 as a width of an inner wall interval is set to the width a+the width b+the width c, and a width on a side opposite to that face and on which the frame 24 is to be put is set to the width d. Note that this width is not necessarily the same in every portion of the mold 201, and as shown in FIG. 5, a width of the mold 201 arranged in the horizontal direction in the drawing may be set to be different from a width of the mold 201 arranged in the vertical direction. Further, a predetermined portion may be formed thicker than another portion.

At Step S4, the mold part 35 is formed by removing the mold 201. At subsequent steps, the imaging element 33 is mounted on the center portion of the first circuit board 31, and the upper part 11 is put on the mold part 35 to manufacture the imaging apparatus shown in FIG. 1 (not shown).

The case where the mold 201 is used to perform the mold-sealing to form the mold part 35 has been described here as an example, but the components 34 may be sealed by another method to form the mold part 35.

For example, the first circuit board 31 may be covered with the mold part 35 previously formed of a predetermined material and bonded thereto. In this case, for example, a space for storing the components 34 may be previously formed in the inside of the mold part 35, but the components 34 is preferably covered with the mold part 35 with a least possible gap.

Furthermore, the mold part 35 molded of a soft material may be pressed to the components 34 and attached to the first circuit board 31, and then the mold part 35 may be formed on the first circuit board 31 at such a step that the mold part 35 is cured.

Furthermore, the mold part 35 may use not a single material, but a plurality of materials. For example, a portion in contact with the component 34, in other words, the inside of the mold part 35 may use a relatively soft material, and the outside of the mold part 35 may use a rigid material.

Furthermore, when the mold 201 is used in forming the mold 35, the plurality of molds 201 may be used to finally form the mold part 35. For example, the mold 201, with which the components 34 are covered, may be used to inject a first material to form the mold part 35, with which the components 34 are covered, and then a mold 201' different from the mold 201 used for the first time may be used to inject a second material to form the mold part 35 for the second time.

Note that the manufacturing step described with reference to FIG. 5 is an example, the mold part 35 and others may be manufactured at another step. For example, there may be used such a step that the imaging element 33 is attached to the first circuit board 31 and then the mold part 35 is formed.

<Another Configuration of Lower Part of Imaging Apparatus>

Figure 6:
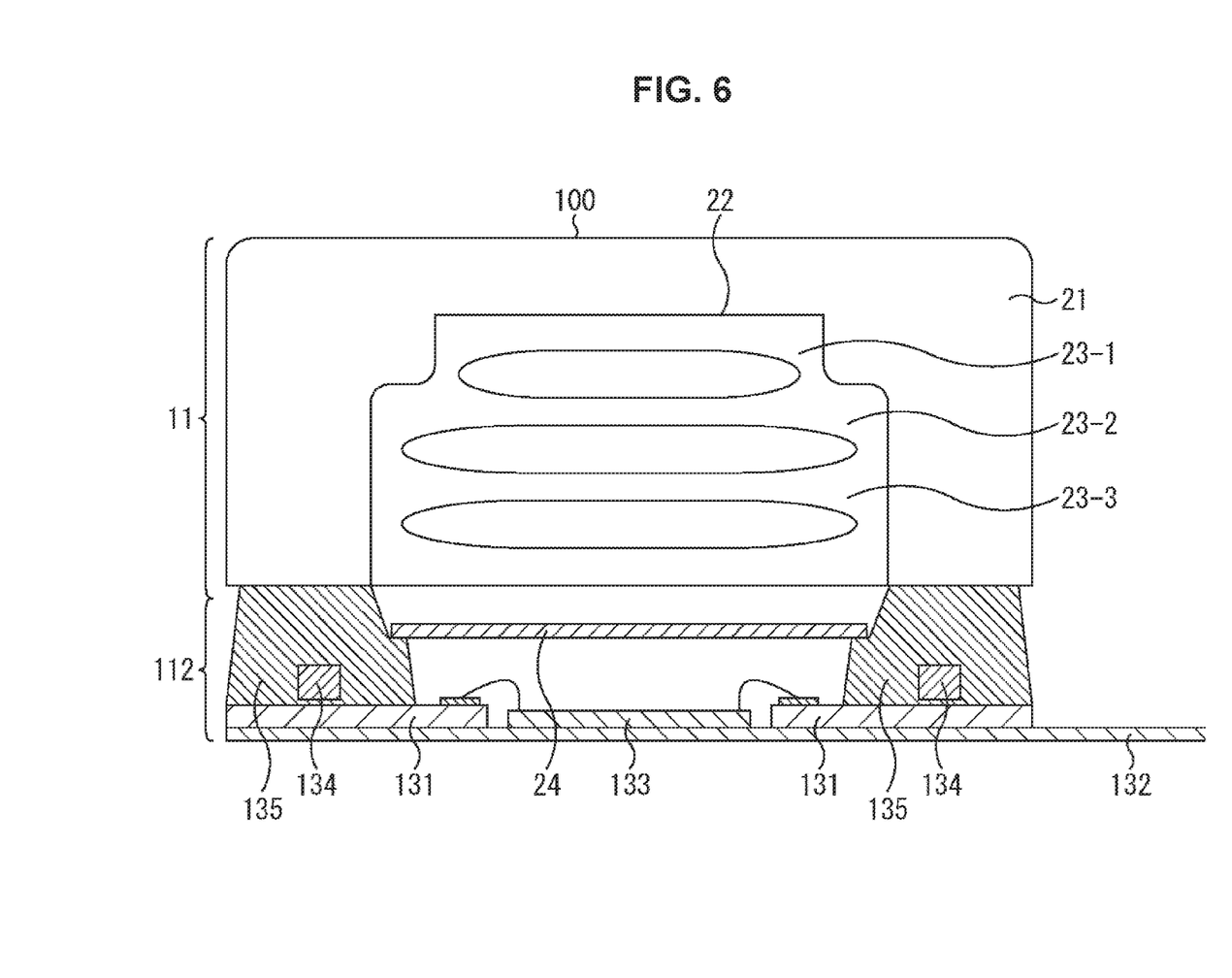
FIG. 6 is a cross-sectional diagram illustrating another configuration of the imaging apparatus.

FIG. 6 shows another configuration of the imaging apparatus. In an imaging apparatus 100 of FIG. 10, since an upper part 11 basically has the same configuration as that of the imaging apparatus 10 of FIG. 1, it is denoted with the same sign and the description is omitted.

Although a lower part 112 also has the same configuration as that of the lower part 12 of FIG. 1, since the shape and the like are different, description is added to different portions. A mold part 135 of the imaging apparatus 100 of FIG. 6 is shaped so as to mount an IRCF 24. As shown in FIG. 6, steps are provided in the inside of the mold part 135, and the IRCF 24 can be mounted on the steps.

In order to provide such steps in the mold part 135, a shape of the mold 201 (FIG. 5) may be set to such a shape. Alternatively, the mold part 35 without steps as shown in FIG. 1 may be formed, and then a portion where the steps are to be formed may be polished to form the steps.

In any case, the steps are provided in the mold part 135, and the IRCF 24 is directly mounted on the steps of the mold part 135, thereby allowing an assembly flow to be simplified.

In the imaging apparatus 10 of FIG. 1, the frame 25 holds the IRCF 24. In the imaging apparatus 100 of FIG. 6, the IRCF 24 is mounted on the mold part 135, thereby allowing the frame 25 to be omitted.

Accordingly, a step of manufacturing the frame 25, a step of mounting the IRCF 24 on the frame 25, a step of mounting the frame 25 on the lower part 112, and the like can be omitted, thereby allowing the assembly flow to be simplified.

Furthermore, when the frame 25 is eliminated, it is possible to thin the imaging apparatus 100 by the thickness of the frame 25.

The center portion of a first circuit board 131 of the imaging apparatus 100 of FIG. 6, on which an imaging element 133 is to be mounted, is formed into a space (cavity), and the imaging element 133 is stored in the space. Further, a second circuit board 132 is attached to the back face of the first circuit board 131. That is, the imaging element 133 is directly mounted on the second circuit board 132, and the first circuit board 131 is connected to the imaging element 133 by wiring 137. Such a structure can be called a die pad less structure.

The imaging element 133 is mounted on the second circuit board 132, thereby allowing the thickness of the lower part 112 to be suppressed more than when the imaging apparatus 133 is mounted on the first circuit board 131. That is, further thinning of the lower part 112 can be realized. The imaging apparatus 100 itself can be thereby thinned.

In this manner, according to the present technology, it is possible to realize further miniaturization and thinning of the imaging apparatus. Further, it is possible to improve the rigidity of the imaging apparatus. Further, it is possible to simplify the assembly flow.

<Electronic Appliance>

The present technology is not limited to the application to the imaging apparatus, it can be applied to electronic appliances in general using an imaging apparatus for an image capturing unit (photoelectric conversion unit), such as image apparatuses such as a digital still camera and a video camera, portable terminal apparatuses having an imaging function such as a cellular phone, copy machines using an imaging apparatus for an image reading unit. Note that a module-like form mounted on an electronic appliance, that is, a camera module may be an imaging apparatus.

Figure 7:
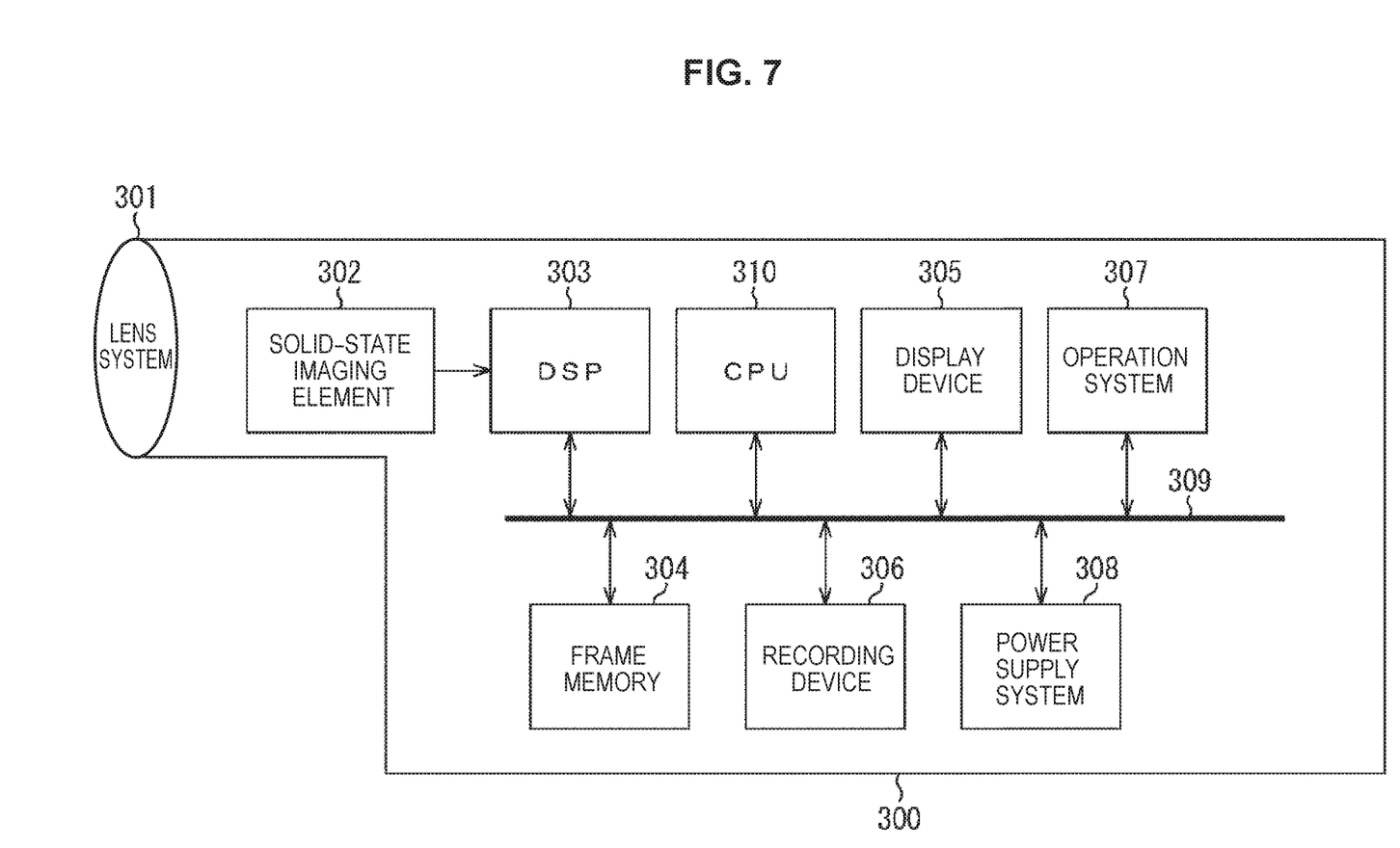
FIG. 7 is a diagram illustrating a configuration of an electronic appliance.

FIG. 7 is a block diagram illustrating a configuration example of an imaging apparatus as an example of an electronic appliance of the present disclosure. As shown in FIG. 7, an imaging apparatus 300 of the present disclosure includes an optical system including a lens group 301, an imaging element 302, a DSP circuit 303 as a camera signal processing unit, a frame memory 304, a display device 305, a recording device 306, an operation system 307, and a power supply system 308.

The DSP circuit 303, the frame memory 304, the display device 305, the recording device 306, the operation system 307, and the power supply system 308 are connected to each other through a bus line 309. A CPU 310 controls each unit within the imaging apparatus 300.

The lens group 301 captures incident light (image light) from a subject to form an image on an imaging surface. The imaging element 302 converts a light amount of the incident light formed into the image on the imaging surface by the lens group 301 into an electric signal in a pixel unit and outputs the signal as a pixel signal. As the imaging element 302, the solid-state imaging element according to the embodiment described above can be used.

The display device 305 includes a panel-type display device such as a liquid crystal display device and an electro luminescence (EL) display device, and displays a moving image or a still image captured by the imaging element 302. The recording device 306 records a moving image or a still image captured by the imaging element 302 in a recording medium such as a video tape or a digital versatile disk (DVD).

The operation system 307 generates an operation command for various functions held by the imaging apparatus under an operation by a user. The power supply system 308 optionally supplies various kinds of power supplies to be an operation power supply of the DSP circuit 303, the frame memory 304, the display device 305, the recording device 306 and the operation system 307, to these supply targets.

The imaging apparatus 300 is applied to a video camera, a digital still camera, and a camera module for a mobile device such as a cellular phone. The imaging apparatus 300 can use the imaging element according to the embodiment described above as the imaging element 302.

Furthermore, in the specification, the system represents a whole apparatus including a plurality of devices.

Note that the effects described in the specification are merely an example, and are not limited, and another effect may be possible.

The present technology is not limited to the above-described embodiments, but various modifications are possible insofar as they are within the scope of the present technology.

Additionally, the present technology may also be configured as below.

(1)
An imaging apparatus including:
a first circuit board in which an imaging element is mounted on a center portion;
a component that is mounted on an outer circumference portion of the center portion of the first circuit board; and
a member that incorporates the component and is provided in the outer circumference portion.

(2)
The imaging apparatus according to (1),
wherein the member is formed by a mold method.

(3)
The imaging apparatus according to (1) or (2), further including:
a lens barrel that holds a lens,
wherein a frame that supports a portion including the lens barrel is located on the member.

(4)
The imaging apparatus according to (3),
wherein the frame includes an infra red cut filter (IRCF).

(5)
The imaging apparatus according to (1),
wherein one side of the first circuit board is connected to a second circuit board, and
wherein a reinforcement member for reinforcing connection between the first circuit board and the second circuit board is provided in a predetermined portion of the second circuit board and the member.

(6)
The imaging apparatus according to (1), further including:
a lens barrel that holds a lens,
wherein a portion including the lens barrel is located on the member.

(7)
The imaging apparatus according to (6),
wherein the member is formed in a shape having a step, and
wherein an infra red cut filter (IRCF) is mounted on a portion of the step.

(8)
The imaging apparatus according to (6),
wherein a portion of the first circuit board on which the imaging element is to be mounted is formed into a cavity, and
wherein a second circuit board is attached to a lower portion of the first circuit board, and the imaging element is mounted on the second circuit board.

(9)
The imaging apparatus according to any of (1) to (8),
wherein the member is formed by covering, with a predetermined mold, the first circuit board to which the component is attached, and injecting a resin to the mold.

(10)
A manufacturing apparatus that manufactures an imaging apparatus, the imaging apparatus including
a first circuit board in which an imaging element is mounted on a center portion,
a component that is mounted on an outer circumference portion of the center portion of the first circuit board, and
a member that incorporates the component and is provided in the outer circumference portion.

(11)
The manufacturing apparatus according to (10),
wherein the member is formed by covering, with a predetermined mold, the first circuit board to which the component is attached, and injecting a resin to the mold.

(12)
A manufacturing method for a manufacturing apparatus that manufactures an imaging apparatus, the imaging apparatus including
a first circuit board in which an imaging element is mounted on a center portion,
a component that is mounted on an outer circumference portion of the center portion of the first circuit board, and
a member that incorporates the component and is provided in the outer circumference portion, the manufacturing method including:
a step of forming the member by covering, with a predetermined mold, the first circuit board on which the component is mounted, and injecting a resin to the mold.

(13)
An electronic appliance including:
an imaging apparatus including
a first circuit board in which an imaging element is mounted on a center portion,
a component that is mounted on an outer circumference portion of the center portion of the first circuit board, and
a member that incorporates the component and is provided in the outer circumference portion; and
a signal processing unit that performs signal processing for a pixel signal outputted from the imaging element.

REFERENCE SIGNS LIST 10 imaging apparatus
21 actuator
22 lens barrel
23 lens
24 IRCF
25 frame
31 first circuit board
32 second circuit board
33 imaging element
34 component
35 mold part
131 first circuit board
132 second circuit board
133 imaging element
134 component
135 mold part

The invention claimed is:

1. An imaging apparatus, comprising:
a first circuit board;
a lens configured to receive incident light;
an imaging element on a first surface of the first circuit board and electrically coupled to the first circuit board via a wire, wherein the first circuit board is configured to receive the incident light on the first surface via the lens;
a member on an outer circumference portion of the first surface of the first circuit board;
an infrared cut filter between the imaging element and the lens; and
a frame coupled to the member via an intermediate member, wherein
the frame comprises a first portion which extends in a first direction perpendicular to an optical axis of the lens,
the first portion of the frame holds the infrared cut filter,
the frame comprises a second portion which extends in a second direction opposite to the first direction,
a first side of the second portion is in contact with a side of the member via the intermediate member,
the first side of the second portion faces the first circuit board, and
the side of the member is opposite to the first circuit board.

2. The imaging apparatus according to claim 1, wherein
the frame comprises a third portion which extends to a third direction along the optical axis of the lens,
a side of the third portion is in contact with the member, and
the side of the third portion is opposite to the lens.

3. The imaging apparatus according to claim 1, further comprising:
a second circuit board coupled to the first circuit board.

4. The imaging apparatus according to claim 3, further comprising:
a reinforcement member between the member and the second circuit board,
wherein the reinforcement member is configured to reinforce the first circuit board with the second circuit board.

5. The imaging apparatus according to claim 1, further comprising:
at least one component on the outer circumference portion of the first circuit board,
wherein the at least one component is in the member.

6. The imaging apparatus according to claim 1, further comprising:
a lens barrel on a second side of the second portion, wherein
the second side is opposite to the first side, and
the lens is held by the lens barrel.

7. The imaging apparatus according to claim 6,
wherein the frame supports the lens barrel.

8. The imaging apparatus according to claim 1,
wherein the member is injection molded.

9. The imaging apparatus according to claim 1, wherein
a first portion of the member has a step shape, and
the infrared cut filter is on the step shape of the member.

10. The imaging apparatus according to claim 1,
wherein the imaging element is in a cavity formed by the first circuit board, the member, the frame, and the infrared cut filter.

11. An imaging apparatus, comprising:
a first circuit board;
a lens configured to receive incident light;
an imaging element on a first surface of the first circuit board and electrically coupled to the first circuit board via a wire, wherein the first circuit board is configured to receive the incident light on the first surface via the lens;
a member on an outer circumference portion of the first surface of the first circuit board;
an infrared cut filter between the imaging element and the lens; and
a frame coupled to the member, wherein
the frame comprises a first portion which extends in a first direction perpendicular to an optical axis of the lens,
the first portion of the frame holds the infrared cut filter,
the frame comprises a second portion which extends in a second direction opposite to the first direction,
a first side of the second portion is in contact with a side of the member,
the first side of the second portion faces the first circuit board,
the side of the member is opposite to the first circuit board,
the frame comprises a third portion which extends in a third direction along the optical axis of the lens, and
the frame comprises a fourth portion which extends in a fourth direction opposite to the third direction.

12. The imaging apparatus according to claim 11, wherein
a side of the third portion is in contact with the member, and
the side of the third portion is opposite to the lens.

13. The imaging apparatus according to claim 11, further comprising:
a second circuit board coupled to the first circuit board.

14. The imaging apparatus according to claim 13, further comprising:
a reinforcement member between the member and the second circuit board,
wherein the reinforcement member is configured to reinforce the first circuit board with the second circuit board.

15. The imaging apparatus according to claim 11, wherein
the frame is coupled to the member via an intermediate member, and
the first side of the second portion that faces the first circuit board is in contact with the side of the member via the intermediate member.

16. The imaging apparatus according to claim 11, further comprising:
a lens barrel on a second side of the second portion, wherein
the second side is opposite to the first side,
the lens is held by the lens barrel, and
the frame supports the lens barrel.

17. The imaging apparatus according to claim 11, wherein the member is injection molded.

18. The imaging apparatus according to claim 11, wherein a first portion of the member has a step shape, and
the infrared cut filter is on the step shape of the member.

19. The imaging apparatus according to claim 11, wherein the imaging element is in a cavity formed by the first circuit board, the member, the frame, and the infrared cut filter.

20. An imaging system, comprising:
a first circuit board;
a lens configured to receive incident light;
an imaging element on a first surface of the first circuit board and electrically coupled to the first circuit board via a wire, wherein
the imaging element is configured to generate image data, and
the first circuit board is configured to receive the incident light on the first surface via the lens;
a member on an outer circumference portion of the first surface of the first circuit board;
an infrared cut filter between the imaging element and the lens;
a frame coupled to the member via an intermediate member; and
a processor coupled to the imaging element, wherein
the processor is configured to process the image data,
the frame comprises a first portion which extends in a first direction perpendicular to an optical axis of the lens,
the first portion of the frame holds the infrared cut filter,
the frame comprises a second portion which extends in a second direction opposite to the first direction,
a side of the second portion is in contact with a side of the member via the intermediate member,
the side of the second portion faces the first circuit board, and
the side of the member is opposite to the first circuit board.

21. An imaging apparatus, comprising:
a first circuit board;
a lens configured to receive incident light;
an imaging element on a first surface of the first circuit board and electrically coupled to the first circuit board via a wire, wherein the first circuit board is configured to receive the incident light on the first surface via the lens;
a member on an outer circumference portion of the first surface of the first circuit board;
an infrared cut filter between the imaging element and the lens;
a frame coupled to the member, wherein the frame comprises a first portion which extends in a first direction perpendicular to an optical axis of the lens, the first portion of the frame holds the infrared cut filter, the frame comprises a second portion which extends in a second direction opposite to the first direction, a first side of the second portion is in contact with a side of the member, the first side of the second portion faces the first circuit board, the side of the member is opposite to the first circuit board,
the frame comprises a third portion which extends in a third direction along the optical axis of the lens, and
the frame comprises a fourth portion which extends in a fourth direction opposite to the third direction; and
at least one component on the outer circumference portion of the first circuit board, wherein the at least one component is in the member.

* * * * *